United States Patent [19]
Alexander

[11] 3,783,883
[45] Jan. 8, 1974

[54] COMBINATION DENTAL FLOSS HOLDER AND TOOTHPICK

[76] Inventor: Dale Alexander, 324 Royal Palm Way, Palm Beach, Fla. 33480

[22] Filed: May 16, 1972

[21] Appl. No.: 253,846

[52] U.S. Cl. ................................................. 132/91
[51] Int. Cl. ........................................... A61c 15/00
[58] Field of Search ...................... 132/91, 90, 92 R, 132/93; 128/60; 206/29

[56] References Cited
UNITED STATES PATENTS

| | | |
|---|---|---|
| 2,762,501 | 9/1956 | Cameron .............................. 206/29 |
| 867,264 | 10/1907 | Evans ................................. 132/92 R |
| 2,510,194 | 6/1950 | Thomas ................................. 132/90 |
| 2,527,857 | 10/1950 | Strachan ............................... 128/60 |

Primary Examiner—Louis G. Mancene
Assistant Examiner—Gregory E. McNeill
Attorney—D. Paul Weaver et al.

[57] ABSTRACT

A device for cleaning teeth formed of a handle portion having a toothpick detachably mounted thereto, and an end portion extending away from the handle portion having a string of dental floss secured thereto.

1 Claim, 3 Drawing Figures

PATENTED JAN 8 1974  3,783,883

COMBINATION DENTAL FLOSS HOLDER AND TOOTHPICK

BACKGROUND OF THE INVENTION

In the cleaning of teeth, it is sometimes desirable to use dental floss, and it is at other times desirable to use a toothpick. However, the dental floss and the toothpicks are usually carried separately in separate receptacles which creates an inconvenience when one wishes to use these items alternatively or selectively.

SUMMARY OF THE INVENTION

This invention avoids having the dental floss and the toothpick in two separate locations by providing a device having a handle portion that has the toothpick detachably mounted therein. An end portion of the handle is formed into a pair of spaced prongs to which the dental floss is secured so as to extend between the prongs. Thus, the device may be used to apply the dental floss to the teeth; and if desired, the toothpick may be detached from the handle portion and applied to the teeth.

DESCRIPTION OF THE PREFERRED EMBODIMENT

Figure 1:
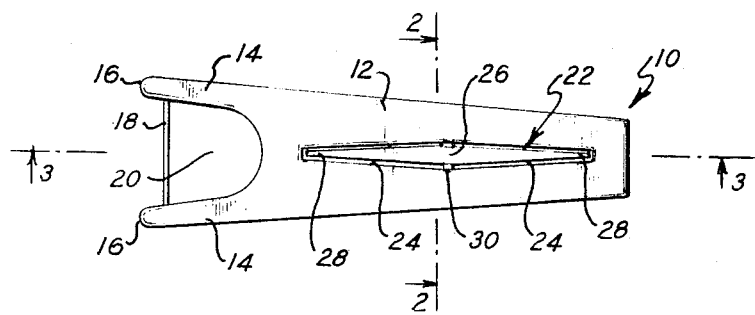
FIG. 1 is a plan view of the device.
Figure 2:
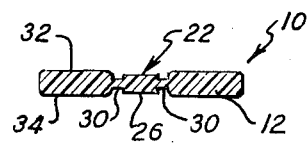
FIG. 2 is a section taken on the line 2—2 of FIG. 1.
Figure 3:
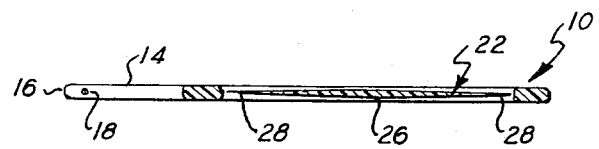
FIG. 3 is a section taken on the line 3—3 of FIG. 1.

The tooth cleaning device 10 is preferably made of a suitable plastic and includes a planar handle portion 12 and an end portion 14. The end portion 14 which is integral with the handle portion 12 is formed of a pair of spaced prongs 16 that extend away from the handle portion 12 and lie in the plane of the handle portion. A string of dental floss 18 is secured at its ends to the prongs 16 and extends across the gap 20 formed between the prongs 16.

A toothpick 22 is located within a cavity 24 in the handle portion 12, the peripheries of the toothpick and the cavity being complemental. The toothpick is widest at its mid-portion 26 and narrows in width from its midportion towards its opposite ends 28. The opposite sides of the mid-portion 26 of the toothpick are connected to the handle portion 12 by frangible bridging elements 30 that are integral with the toothpick and the handle portion. The toothpick 22 is no wider than the handle portion 12 and does not project beyond the surfaces 32 and 34 of the handle portion 12 that are intersected by the cavity 24.

When using the device to clean the teeth with the dental floss 18, the device is grasped by the handle portion 12 and is so manipulated that the dental floss 18 can be applied into the spaces between the teeth in the usual manner. Should it be desired to apply the toothpick 22 to the teeth, the toothpick is separated from the handle portion 12 by breaking the frangible bridging elements 30, afterwhich either end 28 of the toothpick may be applied to the teeth in the usual manner.

Since the bridging elements 30 are of relatively short length, they break easily so as to readily separate the toothpick 22 from the handle portion 12. Since the bridging elements 30 are spaced from the toothpick ends 28, any jagged edges formed on the toothpick by the breaking of the bridging elements 30 will not adversely affect the operation of the toothpick ends 28 in cleaning the teeth.

The bridging elements 30 are located equidistantly from the toothpick ends 28. The bridging elements 30 may readily be broken by forcing either toothpick end 28 out of the plane of the handle portion 12 and applying a torque thereto until the bridging elements break. By spacing the bridging elements equidistantly from the toothpick ends, the maximum torque may be applied to the toothpick, from either end, to break the frangible bridging elements 30 without adversely affecting the tooth cleaning capabilities of the toothpick ends 28.

By not having the toothpick 22 project beyond the handle surfaces 32, 34 when it is mounted to the handle portion 12, the toothpick offers no interference when the device is used to apply dental floss to the teeth.

I claim:

1. A one-piece molded tooth cleaning device comprising an elongated plastic handle portion having a pair of opposed ends, a pair of sides converging from one of said ends to the other of said ends, and opposed top and bottom surfaces, said handle having an elongated cavity extending therethrough from said top surface to said bottom surface, said opening being widest at its mid portion and narrowing in width from the mid portion toward its opposite ends;

a pair of spaced prongs integrally formed on said one end of said handle;

a string of dental floss secured to and extending between said prongs;

a plastic toothpick, having a pair of sides, a pair of opposed ends and top and bottom surfaces, said toothpick being disposed within said cavity in spaced relation with respect to the walls of the cavity, said toothpick being widest at its mid portion and narrowing in width from the mid portion toward its opposite ends, said top surface of said toothpick being disposed below said top surface of said handle, said bottom surface of said toothpick being disposed above said bottom surface of said handle; and frangible plastic bridging elements extending between and integrally connecting the mid portion of said toothpick to said handle within said cavity.

* * * * *